US009742650B2

United States Patent
Baillargeon et al.

(10) Patent No.: US 9,742,650 B2
(45) Date of Patent: *Aug. 22, 2017

(54) SYSTEMS AND METHODS FOR MEASURING AVAILABLE CAPACITY AND TIGHT LINK CAPACITY OF IP PATHS FROM A SINGLE ENDPOINT (71) Applicant: Telefonaktiebolaget L M Ericsson (publ), Stockholm (SE)

(72) Inventors: Steve Baillargeon, Gatineau (CA); Christofer Flinta, Stockholm (SE); Andreas Johnsson, Uppsala (SE); Svante Ekelin, Vallentuna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 246 days.

This patent is subject to a terminal disclaimer.

(21) Appl. No.: 14/588,490

(22) Filed: Jan. 2, 2015

(65) Prior Publication Data
US 2015/0109952 A1  Apr. 23, 2015

Related U.S. Application Data (63) Continuation of application No. 13/141,901, filed as application No. PCT/IB2010/002949 on Nov. 18, 2010, now Pat. No. 9,094,315.

(51) Int. Cl.
H04L 12/26 (2006.01)
(52) U.S. Cl.
CPC .......... *H04L 43/10* (2013.01); *H04L 43/0882* (2013.01)
(58) Field of Classification Search
CPC . H04L 43/10; H04L 43/0882; H04L 12/2697; H04L 43/50; H04L 43/0888;
(Continued)

(56) References Cited

U.S. PATENT DOCUMENTS 6,115,357 A  9/2000  Packer et al.
7,559,078 B2  7/2009  Zhang et al.
(Continued)

FOREIGN PATENT DOCUMENTS

JP  2000-069088 A  3/2000
WO  2007/129134 A1  11/2007
(Continued)

OTHER PUBLICATIONS

International Search Report in corresponding International Application No. PCT/IB2010/002949 mailed Jun. 20, 2011.
(Continued)

*Primary Examiner* — Yee Lam
(74) *Attorney, Agent, or Firm* — Patent Portfolio Builders PLLC (57) ABSTRACT

According to one exemplary embodiment, a method for determining the forward and reverse available capacity or tight link capacity of an IP path from a single endpoint includes the steps of: transmitting, from a source IP endpoint node toward a destination IP endpoint node, a forward packet train including a first plurality of IP test packets over the forward IP path; and receiving, at the source IP endpoint node, a corresponding reverse packet train from the destination IP endpoint node, the reverse packet train including a second plurality of IP test packets over the reverse IP path each of which correspond to a respective one of the first plurality of IP test packets. For those IP path capacity measurements embodiments which are TWAMP-based, no changes are needed to the TWAMP control protocol, e.g., since exemplary embodiments make use of padding octets to transfer additional information which can be used for available IP path capacity and tight IP link capacity calculations.

19 Claims, 11 Drawing Sheets (58) Field of Classification Search
CPC . H04L 43/106; H04L 43/0864; H04L 47/624; H04L 47/56
See application file for complete search history.

(56) References Cited

U.S. PATENT DOCUMENTS

| | | | |
|---|---|---|---|
| 7,778,179 B2 | 8/2010 | Ekelin et al. | |
| 8,064,356 B1* | 11/2011 | Krzanowski | H04L 41/04 370/249 |
| 8,503,320 B2 | 8/2013 | Ekelin et al. | |
| 2006/0285501 A1* | 12/2006 | Damm | H04L 41/142 370/252 |
| 2008/0117810 A1 | 5/2008 | Stott et al. | |
| 2012/0033562 A1 | 2/2012 | Gruber et al. | |

FOREIGN PATENT DOCUMENTS

| | | |
|---|---|---|
| WO | 2008/108697 A1 | 9/2008 |
| WO | 2008/127154 A1 | 10/2008 |
| WO | 2009/070070 A1 | 6/2009 |
| WO | 2009/102246 A1 | 8/2009 |
| WO | 2010033059 A1 | 3/2010 |
| WO | 2010063104 A1 | 6/2010 |
| WO | 2010/082077 A1 | 7/2010 |
| WO | 2010/094035 A1 | 8/2010 |
| WO | 2011/112126 A1 | 9/2011 |

OTHER PUBLICATIONS

A. Morton, et al.; "Two-Way Active Measurement Protocol (TWAMP) Reflect Octets and Symmetrical Size Features"; Internet Engineering Task Force (IETF); Request for Comments 6038, Updates 5357; XP015073044; AT&T Labs; ISSN 2070-1721; Oct. 2010; pp. 1-18.

S. Baillargeon, et al.; "TWAMP Value-Added Octets draft-ballargeon-ippm-twamp-value-added-octets 01.txt"; Internet Engineering Task Force (IETF); Standard Working Draft, Internet Society (ISOC); Networking Group Internet-Draft; Intended Status: Standards Track; Mar. 4, 2011; pp. 1-22.

S. Shalunov, et al.; "A One-way Active Measurement Protocol (OWAMP)"; Network Working Group, Request for Comments : 4656; Category: Standards Track; Sep. 2006; pp. 1-56.

Svante Ekelin, et al.; "Real-Time Measurement of End-to-End Available Bandwidth using Kalman Filtering"; Ericsson Research, Swedish Institute of Computer Science (SICS); pp. 1-12; Stockholm, Sweden.

International Telecommunications Union; "Series Y: Global Information Infrastructure, Internet Protocol Aspects and Next Generation Networks, Internet protocol aspects—Quality of service and network performance"; ITU-T, Telecommunication Standardization Sector of ITU; Y.1540 Amendment 1; Mar. 2009; pp. 1-20; Geneva, Switzerland.

International Written Opinion in corresponding International Application No. PCT/IB2010/002949 mailed Jun. 20, 2011.

Svante Ekelin, et al.; "Real-Time Measurement of End-to-End Available Bandwidth using Kalman Filtering"; IEEE Network Operations & Management Symposium; NOMS; 2006; pp. 73-84; Vancouver, Canada.

International Preliminary Report on Patentability in corresponding International Application No. PCT/IB2010/002949 mailed Jan. 16, 2013.

Chimento et al., "Defining Network Capacity", Network Working Group, Feb. 2008, Request for Comments: 5136, http://www.rfc-archive.org/getrfc.php?rfc=5136.

Morton et al., "Reporting Metrics: Different Points of View draft-ietf-ippm-reporting-metrics-02", Network Working Group, May 30, 2010, Internet Draft, http://tools.ietf.org/html/draft-ietf-ippm-reporting-metrics-02.

Morton et al., "TWAMP Reflect Octets and Symmetrical Size Features draft-ietf-ippm-twamp-reflect-octets-09", Network Working Group, Aug. 17, 2010, Internet-Draft, https://tools.ietf.org/html/draft-ietf-ippm-twamp-reflect-octets-09.

JP Office Action mailed Nov. 11, 2014 in related Application No. JP 2013-539348.

Wikipedia, "Iperf", http://en.wikipedia.org/wiki/Iperf, downloaded Feb. 4, 2015.

* cited by examiner

SYSTEMS AND METHODS FOR MEASURING AVAILABLE CAPACITY AND TIGHT LINK CAPACITY OF IP PATHS FROM A SINGLE ENDPOINT

CROSS-REFERENCE TO RELATED APPLICATIONS

This application is a continuation of U.S. patent application Ser. No. 13/141,901, filed on Jun. 23, 2011, entitled "SYSTEMS AND METHODS FOR MEASURING AVAILABLE CAPACITY AND TIGHT LINK CAPACITY OF IP PATHS FROM A SINGLE ENDPOINT", which is a continuation of, and claims priority from, International Patent Application No. PCT/IB2010/002949, filed on Nov. 18, 2010, the disclosure of which is incorporated here by reference.

TECHNICAL FIELD

The present invention generally relates to Internet Protocol (IP) networks and associated methods and, more particularly, to techniques for measuring available capacity and/or tight link capacity of IP paths in such networks.

BACKGROUND

During the past years, the interest in using mobile and landline/wireline computing devices in day-to-day communications has increased. Desktop computers, workstations, and other wireline computers currently allow users to communicate, for example, via e-mail, video conferencing, and instant messaging (IM). Mobile devices, for example, mobile telephones, handheld computers, personal digital assistants (PDAs), etc. also allow the users to communicate via e-mail, video conferencing, IM, etc. Mobile telephones have conventionally served as voice communication devices, but through technological advancements they have recently proved to be effective devices for communicating data, graphics, etc. Wireless and landline technologies continue to merge into a more unified communication system, as user demand for seamless communications across different platforms increases.

To accommodate the new and different ways in which Internet Protocol (IP) networks are being used to provide various services, new active measurement techniques are being developed and standardized to verify the service performance. Knowing how much capacity is available in real-time on a path (congested or not) across one or more IP networks is valuable information to the network operators or application users. Measurements of available path capacity can be used for network characterization and application performance estimation. For instance, the available path capacity metric can be used for network monitoring, troubleshooting, server or gateway selection, admission control or simply to verify the Service Level Agreement (SLA) of a guaranteed or business class service offering across a network provider.

Active probe based sampling of network paths (or path segments) has been established as a viable methodology for making inferences on the state of the available IP-layer bandwidth capacity on such paths (and path segments). IP-layer performance metrics such as the available path capacity and tight link capacity have been defined in many standard bodies including the IETF and ITU-T. The IP-layer available path capacity (APC) is defined as the available IP-layer bandwidth capacity between a source host and destination host for a given packet type known as type-P packet corresponding to a transport protocol, port number, packet size and Diffserv codepoint (DSCP). The IP-layer tight link capacity is defined as the IP-layer capacity of the link with the smallest IP-layer available link capacity of a path between a source host and destination host for a given packet type known as type-P packet corresponding to a transport protocol, port number, packet size and Diffserv codepoint (DSCP). Note that the IP-layer available link capacity of the IP-layer tight link equals the IP-layer available path capacity.

The IETF IP Performance Metrics (IPPM) working group have defined two IP active measurement protocols: One-Way Active Measurement Protocol (OWAMP) and Two-Way Active Measurement Protocol (TWAMP). OWAMP is designed for measuring one-way packet delay and one-way packet loss between two hosts. TWAMP is based on OWAMP and is designed for measuring one-way and two-way (round-trip) packet delay and packet loss between two hosts.

The TWAMP protocols include two protocols: the TWAMP control protocol and the TWAMP test protocol. The TWAMP control protocol is used to initiate, start and stop TWAMP test sessions. The TWAMP test protocol is used to exchange TWAMP test packets between two TWAMP hosts or endpoints. Test sessions can also be configured without the TWAMP control protocol and this is known as TWAMP light.

The TWAMP measurement architecture is usually comprised of only two hosts with specific roles. This is known as the two-host implementation. One host plays the role of the control-client and session-sender and the other host plays the role of the server and the session-reflector. The host that initiates the TWAMP control TCP connection takes the roles of the control-client and session-sender. The host that acknowledges the TWAMP control TCP connection accepts the roles of the server and session-reflector. In real-life network deployment, each host may participate in several active sessions at the same time, both as control-client/session-sender and server/session-reflector.

In a TWAMP test session, packets are time stamped, tagged with sequence numbers and transmitted from a session-sender to a session-reflector. The session-reflector time stamps the incoming packets, create new test packets (one packet is created for each test packet received by the session-reflector) and send them to the session-sender as soon as possible. Using these time stamps and sequence numbers, the session-sender can then calculate the one-way delay, jitter and packet loss for the session in both the forward path and the reverse path. However, it would be desirable to provide methods, devices, systems and software which are capable of measuring other IP path parameters, such as available path capacity and tight link capacity.

Most available capacity estimation methods (e.g. BART, PathChirp, Spruce, Pathload) need to send and receive packets in groups, called packet trains or simply trains. Each train is sent at a specific transmission rate in a single, given direction. These trains must be identified within each bi-directional test session stream.

The first measurement principle is to send multiple trains within a test session stream from one IP node to another IP node in order to estimate the IP-layer available path capacity and IP-layer tight link capacity in the forward direction. Each train consists of a group of test packets which are separated from each other by a packet interval.

The second measurement principle is referred to as self-induced congestion. According to this principle, in order to measure the IP-layer available path capacity and tight link capacity some trains must cause momentary congestion on the network path. In essence this means that some trains must be sent at a higher rate than what is available on the network path. The congestion is only transient, for the duration of the train which is typically short.

There continues to be a need in this technology area to provide a generic, robust mechanism for IP available path capacity and tight link capacity measurements.

SUMMARY

The following exemplary embodiments provide advantages and benefits relative to measuring or testing of available capacity of IP paths in a network in both directions of transmission from a single endpoint. For example, for those embodiments which are TWAMP-based, no changes are needed to the TWAMP control protocol, e.g., since exemplary embodiments make use of padding octets to transfer additional information which can be used for available IP path capacity calculation.

According to one exemplary embodiment, a method for determining available capacity of an IP path in both directions of transmission from a single endpoint includes the steps of: transmitting, from a source IP endpoint node toward a destination IP endpoint node, a forward packet train including a first plurality of IP test packets over the IP path; and receiving, at the source IP endpoint node, a corresponding reverse packet train from the destination IP endpoint node, the reverse packet train including a second plurality of IP test packets each of which correspond to a respective one of the first plurality of IP test packets.

According to another exemplary embodiment, a system for determining available capacity of an IP path in both directions of transmission from a single endpoint includes a source IP endpoint node having a processor configured to implement a session sender function which transmits a forward packet train including a first plurality of IP test packets over the forward IP path toward a destination IP endpoint node, wherein the processor is further configured to receive a corresponding reverse packet train from the destination IP endpoint node, the reverse packet train including a second plurality of IP test packets over the reverse IP path each of which correspond to a respective one of the first plurality of IP test packets.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

The following description of the exemplary embodiments refers to the accompanying drawings. The same reference numbers in different drawings identify the same or similar elements. The following detailed description does not limit the invention. Instead, the scope of the invention is defined by the appended claims.

Reference throughout the specification to "one embodiment" or "an embodiment" means that a particular feature, structure, or characteristic described in connection with an embodiment is included in at least one embodiment of the present invention. Thus, the appearance of the phrases "in one embodiment" or "in an embodiment" in various places throughout the specification are not necessarily all referring to the same embodiment. Further, the particular features, structures or characteristics may be combined in any suitable manner in one or more embodiments.

Figure 1:
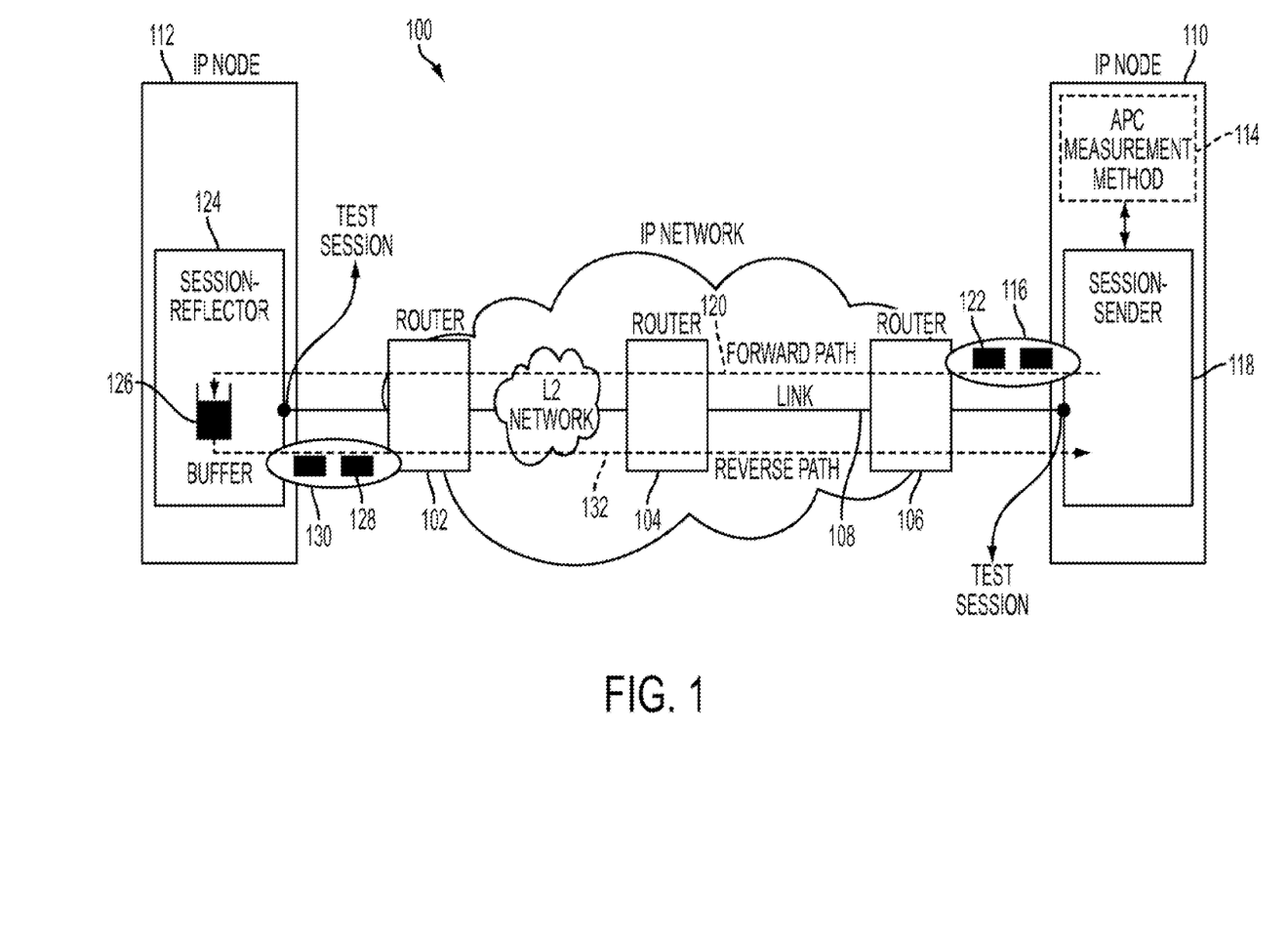
FIG. 1 is a circuit diagram of a portion of an exemplary IP network in which available IP path capacity and tight IP link capacity measurement techniques in accordance with exemplary embodiments can be implemented.

To provide some context for the discussion of testing available path capacity and tight link capacity according to these exemplary embodiments, FIG. 1 illustrates an exemplary IP network 100 in which available path capacity and tight link capacity can be tested. Therein, the IP network (e.g., an IPv4 or IPv6 network) 100 includes, for example, a number of routers 102, 104 and 106 which are connected to one another by wireline or wireless connections (IP hops) to collectively form a forward path 120 and a reverse path 132 between two endpoint IP nodes 110 and 112. A link 108 in the forward path 120 or reverse path 132 can include one or more of an Ethernet wire, an Ethernet connection over a Metro Ethernet network, a wireless connection or any other link-layer media.

According to this exemplary embodiment, endpoint node 110 can, for example, be an IP/UDP node running an active measurement protocol with an available path capacity measurement method or application 114 which is capable of measuring the available bandwidth capacity and/or tight link capacity of the forward path 120 and reverse path 132 in a non-intrusive manner. Specific details of this protocol and corresponding measurement activities are described in more detail below. The IP nodes 110, 112 can be, for example, a host, router, test equipment or any other platform running an IP stack.

To perform an available IP path capacity test or tight IP link capacity test according to exemplary embodiments, a forward packet train 116 is generated by a Session Sender function 118 running on node 110, and transmitted in a forward path direction 120. FIG. 1 illustrates a single forward packet train 116 including two Session Sender IP test packets 122, however it will be appreciated by those skilled in the art that more than two IP test packets can be included in a forward packet train according to exemplary embodiments. The format and contents of the IP test packets according to exemplary embodiments will be described below with respect to FIGS. 2(a), 3(a), 4(a) and 5a).

The forward packet train 116 is received by the other endpoint 112's Session Reflector function 124. The Session Reflector function 124 buffers the test IP packets which it receives in buffer 126, and then uses those buffered packets to generate corresponding Session Reflector test IP packets 128. The Session Reflector test IP packets 128 are transmitted back toward node 110 as part of a reverse packet train 130 transmitted in the reverse path direction denoted by dotted line 132. Again, as noted above, reverse packet train 130 can include more than two IP test packets.

Exit timestamps are provided in the IP test packets 122 and IP test packets 128 to indicate their time of transmission by the Session Sender function 118 and Session Reflector function 124, respectively. Similarly, arrival timestamps are inserted into (or otherwise associated with) the IP test packets 128 to indicate the time at which the corresponding IP test packets 122 in the forward packet train 116 arrived at the endpoint node 112, and into the IP test packets 128 to indicate the time at which the packets 128 arrive back at the endpoint node 110.

Using this information, various IP path capacity metrics, e.g., the available path capacity and tight link capacity, in the forward path direction 120 can be calculated by the APC measurement function 114 from the exit timestamps inserted in the test packets 122 by the Session-Sender function 118 and the arrival timestamps inserted or associated with the test packets 128 at the Session-Reflector function 124. Similarly, the available path capacity and tight link capacity in the reverse path direction 132 can be calculated by the APC measurement function 114 from the exit timestamps inserted in the reflected test packets 128 by the Session-Reflector and the arrival timestamps inserted or associated with the reflected test packets at the Session-Sender 118. Examples of IP path capacities which can be measured or determined in accordance with exemplary embodiments specifically include, but are not limited to, available path capacity (APC) and tight ink capacity (TLC), which are defined in the standards specifications document ITU Y.1450 Amendment 1, March 2009, the disclosure of which is incorporated here by reference. The specific algorithm(s) used by APC measurement function 114 to calculate specific IP path capacity parameters are beyond the scope of this discussion, since any desired technique can be employed. However a purely exemplary algorithm is described in the article entitled "Real-Time Measurement of End-to-End Bandwidth using Kalman Filtering", to Svante Ekelin et al., Network Operations and Management Symposium (NOMS), April 2006, 10$^{th}$ IEEE/IFIP, pp. 73-84, the disclosure of which is incorporated herein by reference.

It will be appreciated by those skilled in the art that the above-described, exemplary portion of an IP network 100, is purely illustrative and that other IP node configurations, IP link configurations, etc., can be used in conjunction with the protocols described above, and in more detail below. For example, the IP node 110 which controls the Session-Sender function 118, as well as the IP node 112 which controls the Session-Reflector function 124, can support multiple concurrent test sessions with different IP packet characteristics (e.g. DiffServ codepoint and packet size). Moreover, the APC measurement function 114 can run on the same IP endpoint node 110 as the Session-Sender function 118 or can run on a separate node or server.

It will be appreciated by the foregoing discussion that calculation of available capacity on a forward path 120 and reverse path 132 from a single endpoint according to exemplary embodiments is enabled by providing information associated with transmission and reception of a packet train on both the forward path 120 and reverse path 132. According to one exemplary embodiment, the TWAMP protocol is extended to provide various additional information elements to enable various aspects of forward and reverse path IP path testing and which, among other things, specify what information is embedded in each test packet padding octet.

Moreover, exemplary embodiments also address how the Session-Sender function 118 and Session-Reflector function use the information provided in the specified IP test packet formats. For example, exemplary embodiments illustrate how a host is able to identify the incoming and outgoing packets that belong to a session, and have knowledge of each session and its associated state. Moreover, exemplary embodiments provide mechanisms for the Session-Sender function 118 to construct the various packet trains within a session, identify the desired reverse packet interval for each train and transmit each packet belonging to a train at a specific forward packet interval to the Session-Reflector function 124. Additionally, the Session-Reflector function 124 according to exemplary embodiments is provided with the capability to be able to identify the incoming packets that belong to a train within a session, store each incoming train and associated measurement data, and send back a corresponding new train at the desired reverse packet interval to the session-sender.

Figure 2A:
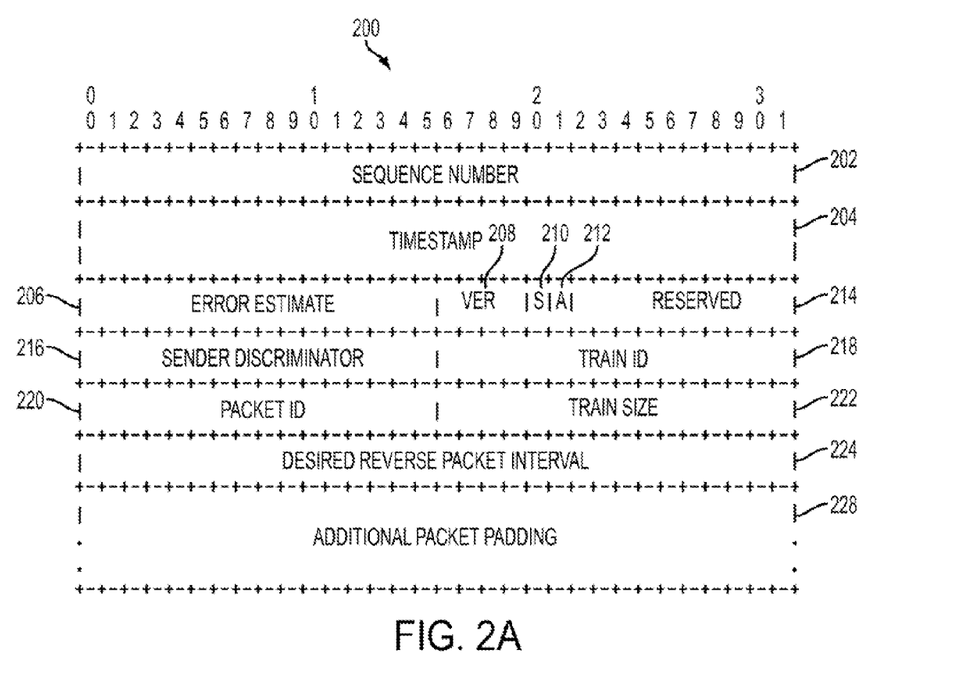
FIG. 2(a) depicts a format of a forward IP test packet.

These, and other, features of IP testing protocols according to exemplary embodiments will now be discussed with respect to the exemplary forward IP test packet 200 shown in FIG. 2(a) and reverse IP test packet 300 shown in FIG. 3(a). FIG. 2(a) illustrates an exemplary forward IP test packet format for use in an unauthenticated mode. Since this exemplary embodiment illustrates an implementation which is an extension of TWAMP protocols, some of the fields shown in FIG. 2 are described in more detail in the TWAMP standards documents, e.g., RFC 4656, RFC 5357 and RFC 6038, and the interested reader is referred to these documents for more information about those fields. For example, in FIG. 2, the first three fields 202, 204 and 206 are also provided in the forward IP test packet format for unauthenticated mode in RFC 4656, the disclosure of which is incorporated by reference. The sequence number field 202 is a field in which the Session Sender 118 provides a sequence number for the IP test packet which uniquely identifies that forward packet according to its transmit order relative to, e.g., other forward test forward packets in the test session. Timestamp field 204 is a field in which an exit (send) timestamp can be placed by a Session Sender 118. Error estimate field 206 can include information useful for correcting the error in the exit timestamp.

Figure 3A:
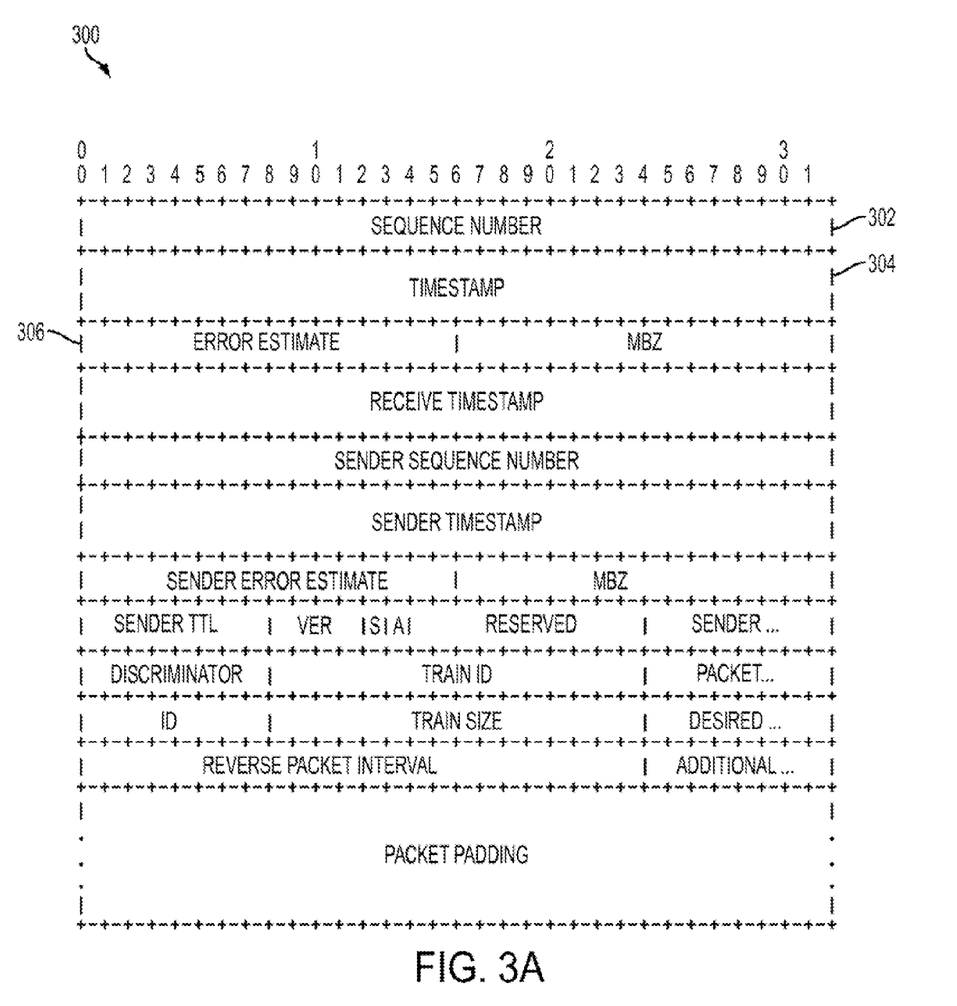
FIG. 3(a) depicts a format of a reverse IP test packet according to an exemplary embodiment.

FIG. 3(a) illustrates an exemplary reverse IP test packet format for use in an unauthenticated mode according to an exemplary embodiment. Since this exemplary embodiment illustrates an implementation which is an extension of TWAMP protocols, some of the fields shown in FIG. 3 are described in more detail in the TWAMP standards documents, e.g., RFC 5357 and RFC 6038, and the interested reader is referred to these documents for more information about those fields. For example, in FIG. 3, the first three fields 302, 304 and 306 are also provided in the IP test packet format for unauthenticated mode in RFC 5357, the disclosure of which is incorporated by reference. The sequence number field 302 is a field in which the Session Reflector 124 provides a sequence number for the reverse IP test packet which uniquely identifies that packet according to its transmit order relative to, e.g., other reverse test packets in the test session. Timestamp field 304 is a field in which exit (send) timestamp can be placed by a Session Reflector 124. Error estimate field 306 can include information useful for correcting the error in the exit timestamp.

Figure 2B:
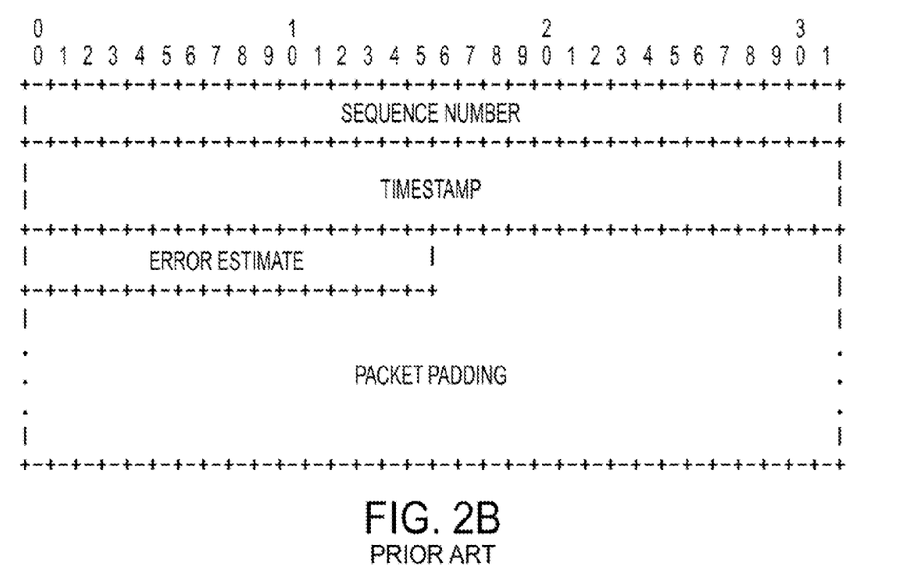
FIG. 2(b) depicts a format of a conventional forward IP test packet.
Figure 3B:
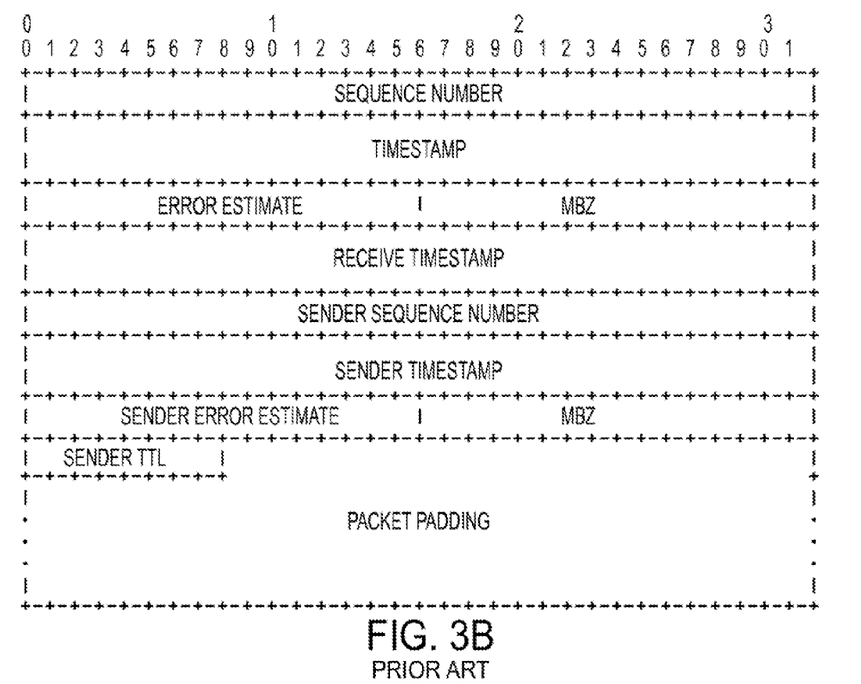
FIG. 3(b) depicts a format of a conventional reverse IP test packet.

In the IP test packet format described in RFC 4656 and RFC 5357, the last octets in the IP test packet are simply designated as optional packet padding. For reference, this conventional forward IP test packet format is provided as FIG. 2(b) and conventional reverse IP test packet format is provided as FIG. 3(b). Exemplary embodiments instead define some of those packet padding octets as fields which are provided, for example, to enable the Session-Sender function 118 to set the first 16 octets in the TWAMP-Test Packet Padding field with information that can be used to calculate the one-way APC and/or TLC in each direction of transmission.

For example, the Version field 208 in the forward IP test packet is encoded in the first 4 bits and can be used to identify the structure of the test padding octets and meaning of the various fields in the format 200, including the padding flags 210 and 212. The Sender Discriminator Present (S) bit 210 is the first padding flag which can, for example, be set to equal to 1 to indicate that the Sender Discriminator field 216 is present. The APC Fields Present (A) bit 212 is the second padding flag in the exemplary IP test packet 200 according to this exemplary embodiment, which can be set equal to 1 to indicate that the APC fields are present. The APC fields are the Train ID field 218, Packet ID field 220, Train Size field 222 and Desired Reverse Rate Interval field 224. The flags 210, 212 are designed to accommodate different combinations of fields and providing reduction in padding overhead when certain fields are not needed. The flags are also introduced in the padding octets to ease information parsing at the Session Sender 118 and Session Reflector 124 when multiple combinations of fields are supported or required.

The Reserved field 214 is reserved for future use (e.g., future flags to extend the use of padding octets) and can be transmitted having zero values by the Session-Sender function 118.

The Sender Discriminator field 216 in the forward IP test packet according to this exemplary embodiment contains, for example, an unsigned 16 bit integer generated by the Session-Sender function 118. The value in this field 216 may be used by the Session-Reflector function 124 and/or the Session-Sender function 118 to identify packets belonging to a test session. This field 216 can be ignored by the Session-Reflector function 124 if it is set to zero. If the field 216 is to include a non-zero value, the Session-Sender function 118 chooses a discriminator value that is unique among all test sessions on its system.

The Train Identifier (TID) field 218 in the forward IP test packet according to this exemplary embodiment contains, for example, an unsigned 16 bit integer generated by the Session-Sender function 118. This field 218 identifies a train within a test session stream and can, for example, have a value which is set to zero in the first test train transmitted by the Session-Sender function 118 and incremented by one for each subsequent train. The value of field 218 can wrap back to zero when its maximum value is reached. The TID field 218 is used by the Session-Sender function 118 and the Session-Reflector function 124 to identify which train the packet belongs to. For each session, the TID of a packet can be compared with the TID of the previous packet in order to see whether a complete train has been received.

The Packet Identifier (PID) field 220 in the forward IP test packet according to this exemplary embodiment contains, for example, an unsigned 16 bit integer generated by the Session-Sender function 118. The PID field 220 identifies each packet within a train of a test session stream and is unique for each packet in a train. The PID field 220 can be set to zero in the first packet of a train transmitted by the Session-Sender function 118 and can, for example, be incremented by one for each subsequent packet in the train.

The Train Size (TS) field 222 in the forward IP test packet according to this exemplary embodiment contains, for example, an unsigned 16 bit integer generated by the Session-Sender function 118 which specifies the number of test packets in the train sent by the Session-Sender function 118.

The Desired Reverse Packet Interval (DRPI) field 224 in the forward IP test packet according to this exemplary embodiment contains, for example, an unsigned 32 bit integer generated by the Session-Sender function 118. The DRPI field 224 indicates the desired inter-packet time interval that the Session-Reflector function 124 uses when transmitting the reflected test packets back towards the Session-Sender function 118. The format of this field can specify a fractional part of a second in a manner which is similar to the technique for specifying a fractional part of a second used for timestamping in, for example, OWAMP [RFC4656].

Similar fields are provided to the IP test packet 300 for use in the reverse path direction 132 as shown in FIG. 3(a). These fields will have the same functions as their counterparts described above with respect to FIG. 2(a), which functions are not reiterated here for brevity.

It will be appreciated by those skilled in the art that it is not required to include all of the extra fields illustrated in FIG. 2(a) in IP test packets according to some other exemplary embodiments. One or more fields can be omitted and others could be added. For example, a Session Sender function 118 may decide to omit the Session Discriminator field 216 (as opposed to sending it with zeroes) in the padding octets and APC/TLC can then be measured based on the APC fields. In this example, the Session Sender 118 and Session Reflector 124 will have to find a way to identify the test packets that belong to a session without using the Sender Discriminator 239 (e.g. using information from the IP header). As another example, a Session Sender function 118 may decide to omit the APC fields in the padding octets and delay/loss can be measured for a test session by using the Sender Discriminator 216 as a way to identify the test packets that belong to a session. Other variants are also possible.

Figure 4A:
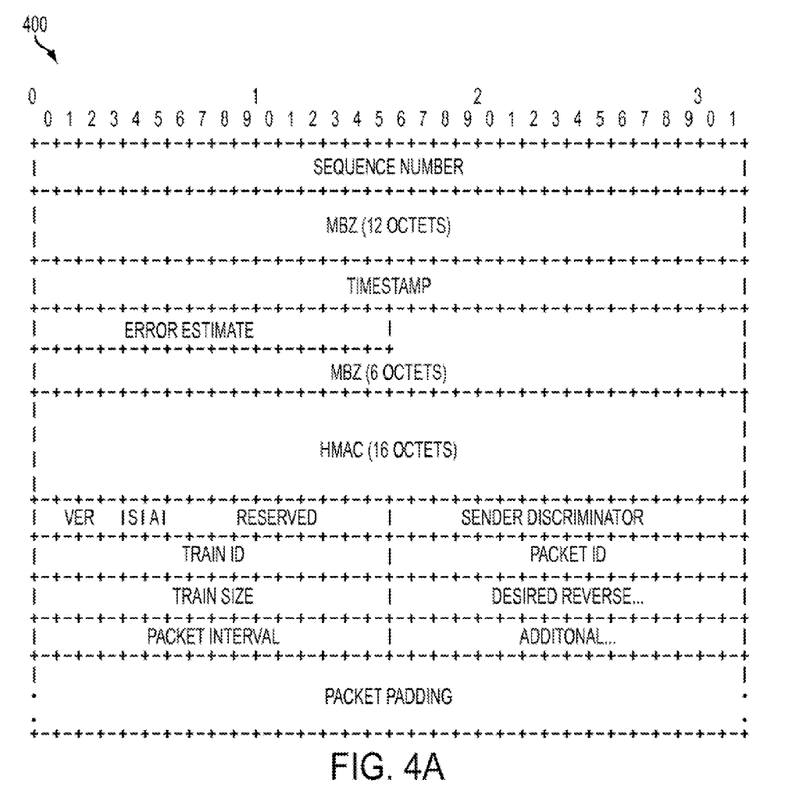
FIG. 4(a) depicts a format of a forward IP test packet.
Figure 4B:
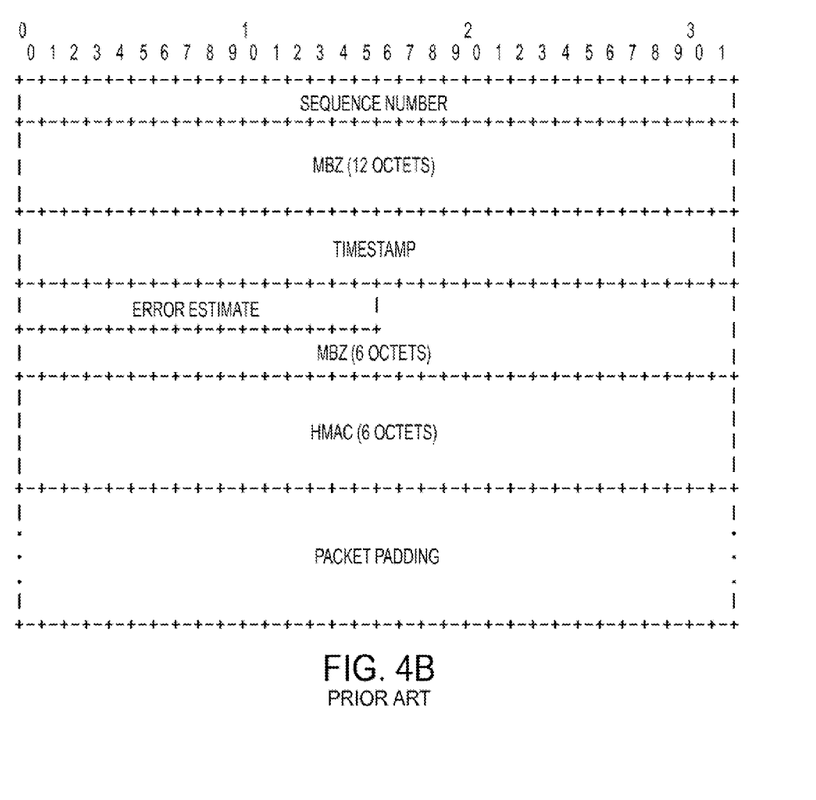
FIG. 4(b) depicts a format of another conventional forward IP test packet.
Figure 5A:
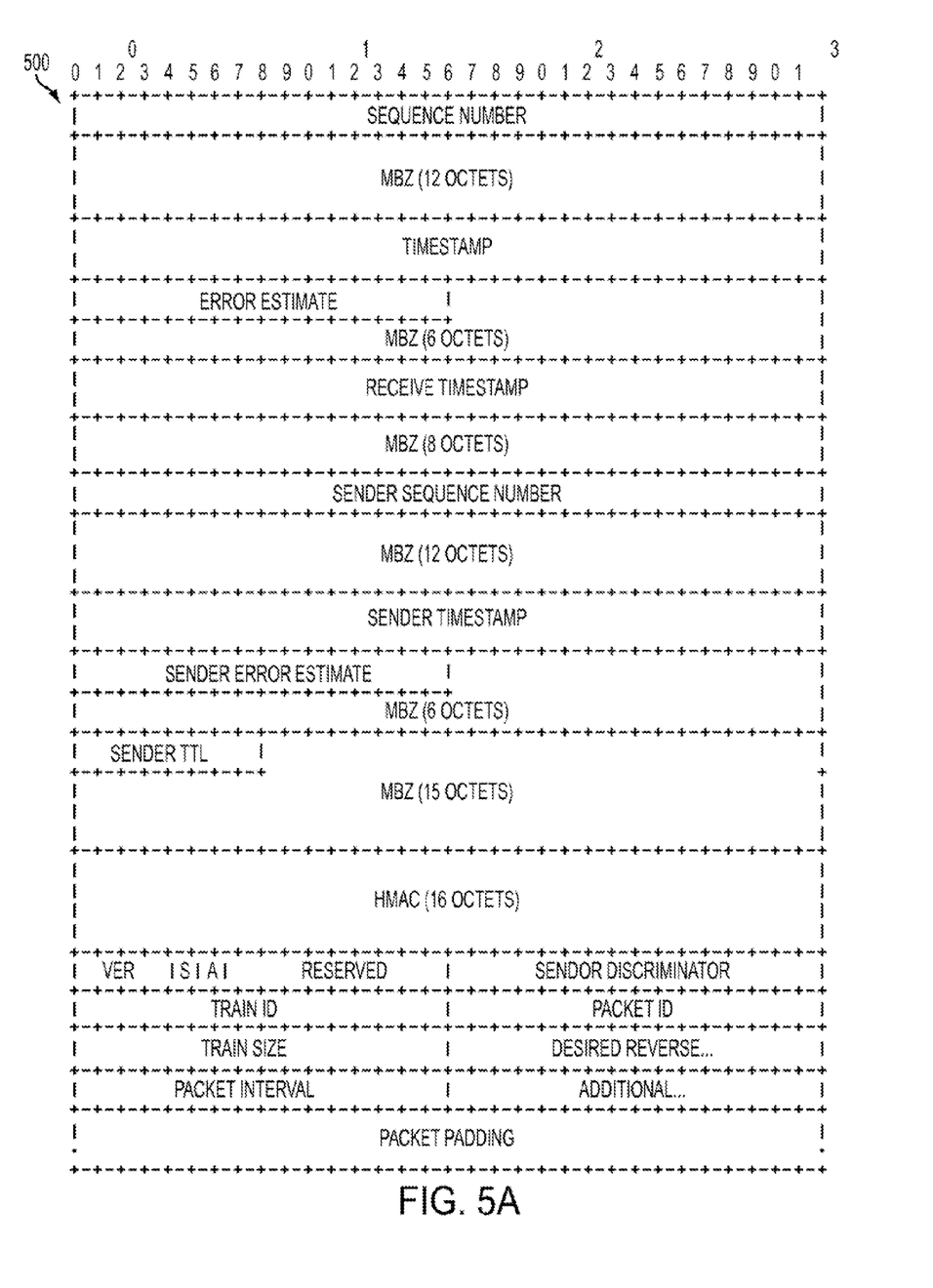
FIG. 5(a) depicts a format of a reverse IP test packet according to another exemplary embodiment.
Figure 5B:
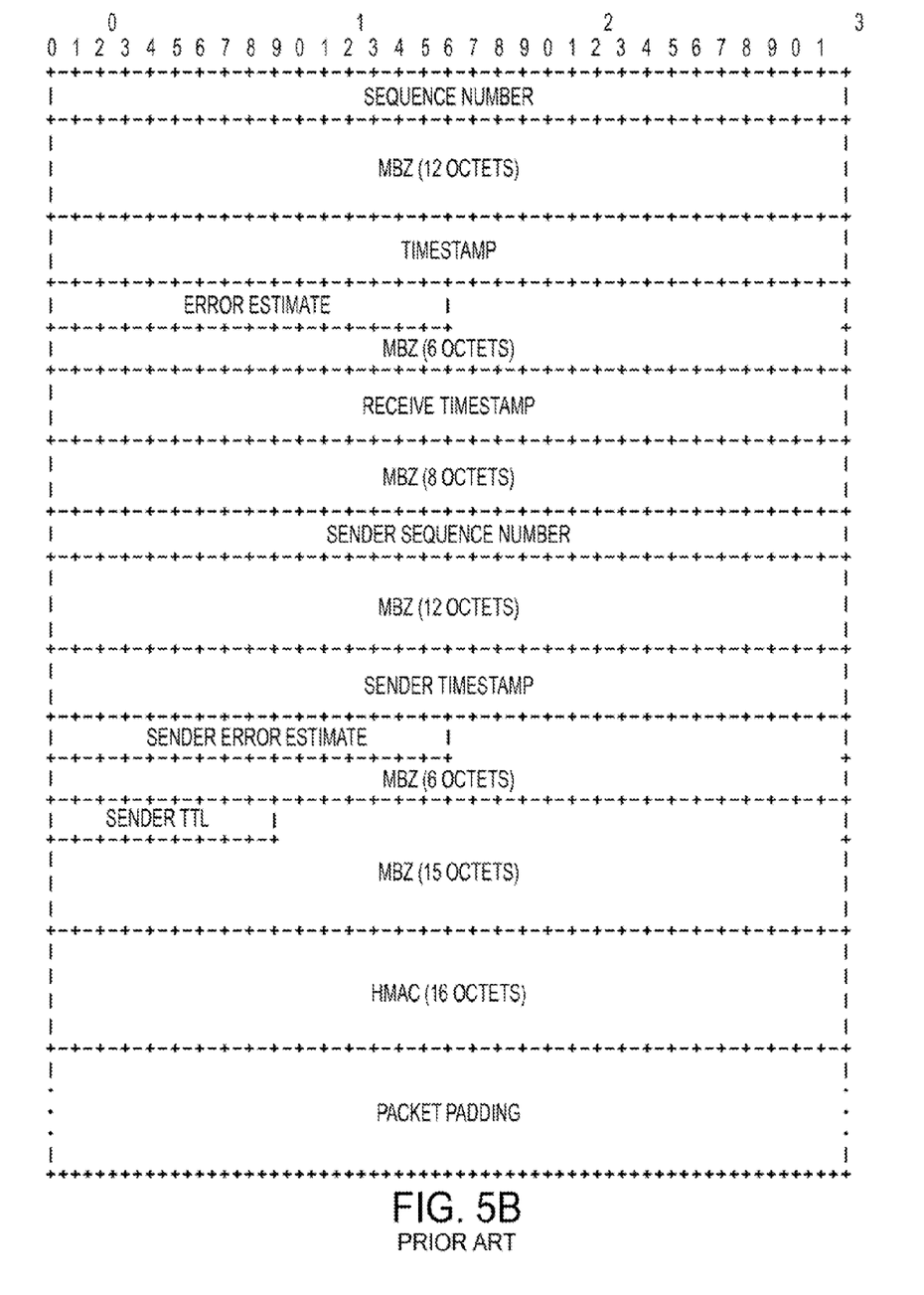
FIG. 5(b) depicts a format of another conventional reverse IP test packet.

The IP test packet fields described above with respect to the exemplary embodiment of FIG. 2(a) and FIG. 3(a) can also be provided to IP test packets which are used in an authenticated or encrypted mode. An example of such a forward IP test packet 400 is provided as FIG. 4(a), wherein fields having the same labels as described above with respect to FIG. 2(a) provide similar functionality in the IP test packet 400. An example of such a reverse IP test packet 500 is provided as FIG. 5(a), wherein fields having the same labels as described above with respect to FIG. 3(a) provide similar functionality in the IP test packet 500. For comparison purposes, a conventional forward IP test packet usable in authenticated or encrypted mode as described in RFC 4656 is provided as FIG. 4(b), and a conventional reverse IP test packet usable in authenticated or encrypted mode as described in RFC 5357 is provided as FIG. 5(b).

When a test session is configured for APC measurements according to exemplary embodiments, the Session-Sender function 118 can generate a plurality of test packets using, for example, one of the formats described above with respect to FIGS. 2(a) and 4(a). The Session-Sender function 118 can then group the generated IP test packets 122 in one or more trains 116 and send the trains 116 towards the Session-Reflector function 124 at the desired forward packet intervals, e.g., as provided by the available path capacity measurement method, tool or algorithm 114.

According to this exemplary embodiment, the Session-Reflector function 124, configured for APC measurements, reads the Version field 208, S flag 210 and A flag 212 as IP test packets 122 are received. For each IP test packet 122, if the Version field 208, the S flag 210 and the A flag 212 are all equal to a predetermined value, e.g., 1, the Session-Reflector function 124 continues reading and extracting the information from the remaining APC padding octets in that IP test packet. If Version field 208, the S flag 210 or the A flag 212 is not equal to the predetermined value, e.g., 1, the Session-Reflector function 124 can, for example, follow the procedures and guidelines described in section 4.2 of RFC5357 and transmit the IP test packet as quickly as possible (including any other IP test packets that are currently stored for the test session, since this means that the characteristics of the test session have suddenly changed and the Session-Reflector function 124 must revert back to its normal mode of operation and transmit all test packets that are currently stored locally.

After reading and extracting all of the APC padding octets, the Session-Reflector function 124 buffers the packets belonging to each session in buffer 126 (or stores the packet-level performance data) and then transmits the buffered IP test packets (after suitable processing, e.g., to add timestamp data) in reverse packet trains 130 at the given packet interval indicated in the Desired Reverse Packet Interval field 224, for example, taken from the last stored packet of each forward packet train 116.

For each incoming IP test packet 116 within a train 122 of a test session stream, the Packet ID 220 is compared to the Train Size 222 in order to see if a complete train has been collected by the Session-Reflector function 124. According to this exemplary embodiment, a reverse packet train 130 is transmitted as quickly as possible after the last packet of the corresponding forward train packet 116 has been received. The last packet within a train has, for example, a PID field 220 value equal to the value of the Train Size field 222 minus 1.

In case of packet loss, the Session-Reflector function 124 transmits the incomplete train when it receives a forward IP test packet with a TID field 218 value belonging to the next train for a given session, or after a timeout. The timeout could, for example, be the REFWAIT timer specified in section 4.2 of [RFC5357]. Packets arriving out-of-order within a train 116 are buffered at the Session-Reflector function 124 according to this exemplary embodiment only if the corresponding reverse train 130 has not yet been transmitted to the Session-Sender function 118. If the corresponding reverse IP test packet train 130 has already been transmitted then out-of-order packets associated with that train 130 can be discarded.

Generally speaking, for those exemplary embodiments which implement IP path capacity testing in accordance with the afore-described modified TWAMP approach, the TWAMP Session-Reflector function 124 can follow the procedures and guidelines in described in Section 4.2 of RFC5357, with the changes and additional functions described above. For example, the Session-Reflector test packets 128 and their content can follow the same procedure and guidelines as defined in TWAMP [RFC5357] and TWAMP Reflect Octets and Symmetrical Size Features [RFC6038], except that the packets 128 will reuse the APC padding octets, i.e., the new fields 208-224 described above, provided in the Sender's Packet Padding.

Other considerations associated with existing TWAMP standardized protocols for adaptation to path capacity measurements according to these exemplary embodiments may also be implemented, as will be appreciated by those skilled in the art. For example, when using the recommended truncation process in RFC5357, the Session-Reflector function 124 must (according to one exemplary embodiment) truncate exactly 27 octets of padding in the unauthenticated mode, and exactly 56 octets in authenticated and encrypted modes.

Moreover, APC measurement according to these exemplary embodiments may also introduce some additional considerations when the test sessions operate in accordance with TWAMP Light. For example, when the Session-Reflector function 124 does not have knowledge of the session state, the measurement system will only be capable to estimate or calculate the available path capacity in the forward path direction of transmission since APC measurements in the reverse path direction requires the Session-Reflector function 124 to have knowledge of the session state and be able to identify the test packets belonging to a specific test session. Thus, for measurement of the reverse available IP path capacity and reverse tight IP link capacity according to exemplary embodiments, the Session-Reflector function 124 has knowledge of the session state and implements a local policy to demultiplex the received test packet to the correct test session, e.g., using the Sender Discriminator field contained in the packet padding.

Exemplary embodiments provide for a number of advantages associated with available IP path capacity and tight IP link capacity testing. For example, for those embodiments which are TWAMP-based, no changes are needed to the TWAMP control protocol, e.g., since exemplary embodiments make use of padding octets to transfer additional information. The available path capacity and/or tight link capacity can be measured in TWAMP light, i.e. with TWAMP test sessions that are established without the TWAMP-Control protocol. The exemplary embodiments thus provide for interoperability between different vendors. The proposed TWAMP enhancements are backward compatible with TWAMP standard specification. Standard TWAMP session-senders and session-reflectors are not affected by hosts using the TWAMP enhancements according to exemplary embodiments. Standard TWAMP session-reflector may be used for partial bandwidth measurements for instance.

Figure 6:
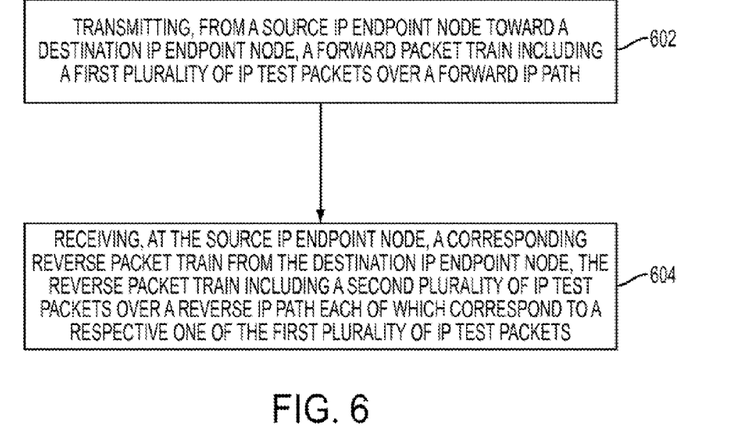
FIG. 6 is flowchart illustrating a method of determining capacity of an IP path according to an exemplary embodiment.

Moreover, although the afore-described exemplary embodiments are described in the context of a modified TWAMP IP test packet format, the present invention is not so limited. As illustrated in the flowchart of FIG. 6, a general method for determining the available capacity and/or tight link capacity of an IP path includes a step 600 of transmitting, from a source IP endpoint node toward a destination IP endpoint node, a forward packet train including a first plurality of IP test packets over the forward path 120 and a step 602 of receiving, at the source IP endpoint node, a corresponding reverse packet train from the destination IP endpoint node, the reverse packet train including a second plurality of IP test packets over the reverse path each of which correspond to a respective one of the first plurality of IP test packets. Unlike conventional IP path measurement techniques, exemplary embodiments provide for a reflection or echoing of a forward IP test packet train as a reverse IP test packet train on a reverse path 132. One, some or all of the new fields described above with respect to FIGS. 2(a), 3(a), 4(a) and 5(a) may be included in the IP test packets.

Figure 7:
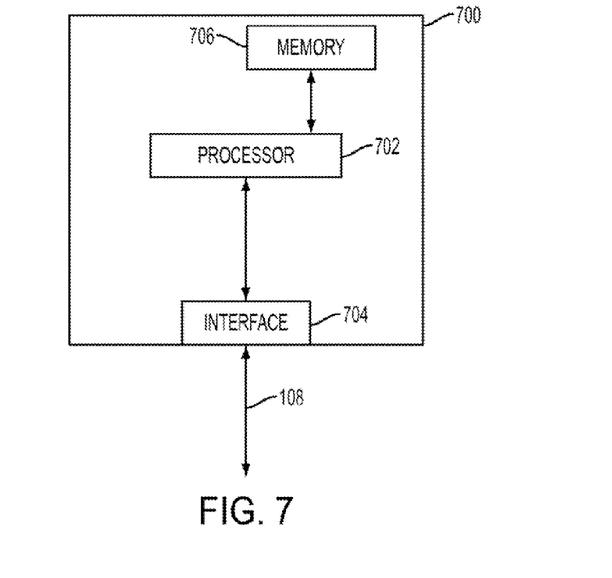
FIG. 7 depicts an exemplary IP endpoint node according to an exemplary embodiment.

IP endpoint nodes 110 and 112, which are generally depicted in FIG. 1 may, for example, include the elements shown in the IP endpoint node 700 in FIG. 7. For example, an IP endpoint node will generally include a processor 702 which is capable of running software, e.g., application software capable of instantiating instances of the Session-Sender 118 and/or Session-Reflector 124 functions described above. Processor 702 is also capable of generating, transmitting and/or receiving the various IP test packets described above, e.g., with respect to FIGS. 2(*a*), 3(*a*), 4(*a*), 5(*a*), potentially via an interface 504 to IP link 108, which interface can represent the desired protocol stack (e.g., IP/UDP, etc.) and may include hardware and/or software. The IP endpoint node 700 can include one or more memory devices, represented by memory device 706, which can be used, e.g., to buffer IP test packets as described above.

Although the features and elements of the embodiments are described in those embodiments in particular combinations, each feature or element can be used alone without the other features and elements of the embodiments or in various combinations with or without other features and elements disclosed herein. The methods or flow charts provided in the present application may be implemented, at least in part, in a computer program, software, or firmware tangibly embodied in a computer-readable storage medium for execution by a general purpose computer or a processor. This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

The invention claimed is:

1. A method, comprising:
   receiving, from a source endpoint node by a destination endpoint node, a forward packet train including a first plurality of test packets over a path in a forward direction, wherein at least one of the first plurality of test packets includes a reverse packet field containing an inter-packet time interval and the forward packet train is transmitted by the source endpoint node at a first rate; and
   transmitting, by said destination endpoint node to said source endpoint node at a second rate that is different from the first rate, a corresponding reverse packet train including a second plurality of test packets over the path in a reverse direction, each of the test packets in the second plurality of test packets corresponding to a respective one of said first plurality of test packets,
   wherein the second rate is indicated by the inter-packet time interval in the at least one of the first plurality of test packets.

2. The method of claim 1, further comprising:
   copying information from the first plurality of test packets into said second plurality of test packets; and
   determining forward and reverse available capacity or tight link capacity of said path based on said copied information including arrival timestamps and exit timestamps.

3. The method of claim 1, wherein the reverse packet field is a reverse packet interval field.

4. The method of claim 1, further comprising:
   buffering said first plurality of test packets at said destination endpoint node including their corresponding exit timestamps and arrival timestamps,
   wherein the destination endpoint node transmits said second plurality of test packets after receipt of all of said first plurality of test packets.

5. The method of claim 1, wherein each of said first plurality of test packets includes a train identification field identifying said first plurality of test packets as belonging to said forward packet train.

6. The method of claim 1, each of said first plurality of test packets includes a train size field indicating a number of said first plurality of test packets in said forward packet train.

7. The method of claim 1, wherein each of said first plurality of test packets includes a packet identifier field uniquely identifying each test packet belonging to said forward packet train.

8. The method of claim 1, wherein each of said first plurality of test packets includes a sender discriminator field identifying said first plurality of test packets as belonging to a test session between said source endpoint node and said destination endpoint node.

9. The method of claim 1, wherein said first plurality of test packets and said second plurality of test packets are Two-Way Active Measurement Protocol (TWAMP) test packets.

10. A system for determining capacity of an path, comprising:
    a destination endpoint node including:
      a processor configured to implement a session reflector function which receives a forward packet train including a first plurality of test packets over the path in a forward direction from a source endpoint node, wherein at least one of the first plurality of test packets includes a reverse packet field containing an inter-packet time interval and the forward packet train is transmitted by the source endpoint node at a first rate; and
      wherein said processor is further configured to transmit a corresponding reverse packet train to said source endpoint node at a second rate that is different from the first rate, said reverse packet train including a second plurality of test packets over the path in a reverse direction, each of the test packets in the second plurality of test packets corresponding to a respective one of said first plurality of test packets,
      wherein the second rate is indicated by the inter-packet time interval in the at least one of the first plurality of test packets.

11. The system of claim 10, wherein the source endpoint node includes a processor configured to extract information from said second plurality of test packets, and to determine forward and reverse available capacity or tight link capacity of said path based on said extracted information.

12. The system of claim 10, wherein said source endpoint node includes a processor configured to generate a forward packet interval and transmit said first plurality of test packets at said first rate.

13. The system of claim 10, wherein said reverse packet field is a reverse packet interval field.

14. The system of claim 10, wherein the destination endpoint node further comprises:
    a buffer configured to store said first plurality of test packets at said destination endpoint node including their corresponding exit timestamps and arrival timestamps; wherein
    the processor is further configured to transmit said second plurality of test packets after receipt of all of said first plurality of test packets.

15. The system of claim 10, wherein each of said first plurality of test packets includes a train identification field identifying said first plurality of test packets as belonging to said forward packet train.

16. The system of claim 10, wherein each of said first plurality of test packets include a train size field indicating a number of said first plurality of test packets in said forward packet train.

17. The system of claim 10, wherein each of said first plurality of test packets includes a packet identifier field uniquely identifying each test packet belonging to said forward packet train.

18. The system of claim 10, wherein each of said first plurality of test packets includes a sender discriminator field identifying said first plurality of test packets as belonging to a test session between said source endpoint node and said destination endpoint node.

19. The system of claim 10, wherein said first plurality of test packets and said second plurality of test packets are Two-Way Active Measurement Protocol (TWAMP) test packets.

* * * * *